United States Patent
Yamashita

(10) Patent No.: US 10,731,538 B2
(45) Date of Patent: Aug. 4, 2020

(54) INTERNAL COMBUSTION ENGINE

(71) Applicant: TOYOTA JIDOSHA KABUSHIKI KAISHA, Toyota-shi (JP)

(72) Inventor: Hideo Yamashita, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 20 days.

(21) Appl. No.: 16/165,030

(22) Filed: Oct. 19, 2018

(65) Prior Publication Data

US 2019/0186330 A1    Jun. 20, 2019

(30) Foreign Application Priority Data

Dec. 19, 2017   (JP) ................................. 2017-243051

(51) Int. Cl.
| | |
|---|---|
| *F01N 3/10* | (2006.01) |
| *F01N 13/10* | (2010.01) |
| *F02D 41/38* | (2006.01) |
| *F02F 1/00* | (2006.01) |
| *F01N 13/14* | (2010.01) |
| *F02D 41/02* | (2006.01) |
| *F01N 3/00* | (2006.01) |
| *F02B 77/02* | (2006.01) |
| *F02D 41/00* | (2006.01) |

(52) U.S. Cl.
CPC ............. *F01N 13/102* (2013.01); *F01N 3/00* (2013.01); *F01N 13/14* (2013.01); *F02B 77/02* (2013.01); *F02D 41/0087* (2013.01); *F02D 41/0245* (2013.01); *F02D 41/38* (2013.01); *F02F 1/004* (2013.01); *F02D 41/008* (2013.01); *F02D 2041/389* (2013.01); *F05C 2251/048* (2013.01)

(58) Field of Classification Search
CPC ...... F02B 77/02; F02D 41/38; F02D 41/0087; F02D 41/0245; F02F 1/004; F01N 13/14; F01N 3/00
USPC ............................................................ 60/299
See application file for complete search history.

(56) References Cited

U.S. PATENT DOCUMENTS

| | | | | |
|---|---|---|---|---|
| 3,583,290 | A * | 6/1971 | Briggs ..................... | F02B 77/02 92/158 |
| 4,604,779 | A * | 8/1986 | Narita ................ | B22D 19/0009 123/193.5 |
| 5,150,572 | A * | 9/1992 | Johnson ................... | F01N 13/14 123/193.5 |

(Continued)

FOREIGN PATENT DOCUMENTS

| | | | | |
|---|---|---|---|---|
| DE | | 3915988 A1 * | 12/1989 | .............. F02B 77/02 |
| DE | 102015203157 A1 * | | 8/2016 | .............. F02B 29/04 |

(Continued)

*Primary Examiner* — Jason D Shanske
(74) *Attorney, Agent, or Firm* — Oblon, McClelland, Maier & Neustadt, L.L.P.

(57) ABSTRACT

In the specified cylinder, the heat shield film is formed on the top surface of the piston, the surface of the parachute part of the exhaust valve, and the wall surface of the exhaust port. On the other hand, in cylinder other than the specified cylinder, the heat shield film is formed only on the top surface of piston. The heat shield film is also formed on the inner wall of the exhaust manifold, the inner wall of the exhaust pipe, and the inner wall of the housing. Among the exhaust manifold, however, the heat shield film is not formed on the inner wall of the branch pipe connected to the exhaust port of the other cylinder.

4 Claims, 4 Drawing Sheets

(56) References Cited

U.S. PATENT DOCUMENTS

| | | | |
|---|---|---|---|
| 2002/0195077 A1* | 12/2002 | Rieger | F02F 1/38 |
| | | | 123/193.5 |
| 2003/0111026 A1* | 6/2003 | Baba | F02B 77/02 |
| | | | 123/41.82 R |
| 2004/0083714 A1* | 5/2004 | Tsuruta | F01N 13/14 |
| | | | 60/272 |
| 2012/0042859 A1 | 2/2012 | Sakai | |
| 2013/0146041 A1* | 6/2013 | Hijii | C25D 11/04 |
| | | | 123/668 |
| 2013/0327289 A1* | 12/2013 | Hiratsuka | F16J 1/00 |
| | | | 123/193.6 |
| 2014/0245994 A1* | 9/2014 | Nishikawa | F02B 77/11 |
| | | | 123/434 |
| 2015/0211431 A1* | 7/2015 | Harada | F02F 3/14 |
| | | | 123/295 |
| 2017/0030246 A1* | 2/2017 | Baek | F01N 13/16 |
| 2017/0183997 A1* | 6/2017 | Tapp | F01N 13/14 |
| 2017/0284333 A1* | 10/2017 | Kawanaka | F02F 3/12 |
| 2017/0292470 A1* | 10/2017 | Yoshinaga | C23C 4/129 |

FOREIGN PATENT DOCUMENTS

| | | |
|---|---|---|
| EP | 1 353 045 A2 | 10/2003 |
| JP | 60-143127 U | 9/1985 |
| JP | 61-003915 U | 1/1986 |
| JP | 2003-307105 | 10/2003 |
| JP | 2010-249008 | 11/2010 |

\* cited by examiner

INTERNAL COMBUSTION ENGINE

CROSS-REFERENCE TO RELATED APPLICATION

The present disclosure claims priority under 35 U.S.C. § 119 to Japanese Patent Applications No. 2017-243051, filed on Dec. 19, 2017. The contents of these applications are incorporated herein by reference in their entirety.

TECHNICAL FIELD

The present disclosure relates to an internal combustion engine. More specifically, the present disclosure relates to an internal combustion engine including a heat shield film.

BACKGROUND

JP2010-249008A discloses an internal combustion engine in which a heat shield film is formed on a wall surface of a combustion chamber. This heat shield film has an anodized layer. The anodized layer has a porous structure. According to the porous structure, the anodized layer exhibits lower thermophysical properties in terms of thermal conductivity and thermal capacity per unit volume than any other component parts of the combustion chamber without the anodized layer.

According to such the properties, it is possible to make temperature of the surface on which the heat shield is formed follow that of working gas in the combustion chamber. Specifically, in an expansion stroke of the engine, it is possible to make the temperature of the surface follow rising temperature of the working gas. Also, in an intake stroke of the engine, it is possible to make the temperature of the surface follow that of intake air being relatively lower temperature. Hereinafter, such follow-up characteristics are also referred to as a "swing characteristic". According to the heat shield film having the swing characteristic, it is possible to achieve both reduction in cooling loss and suppression of occurrence of knocking.

JP2003-307105A discloses an exhaust valve having a heat shield film formed on a surface of its parachute part. JPS61-3915U and JPS60-143127U disclose an internal combustion engine in which a heat shield film is formed in an inner wall of an exhaust manifold. These heat shield films are formed by a thermal spraying method. The heat shield films formed by the thermal spraying method have a porous structure like the anodized layer mentioned above. Therefore, the above-mentioned effect due to the swing characteristic are expected in these prior arts.

In general, an internal combustion engine mounted on a vehicle has a catalyst in an exhaust pipe of the engine. This catalyst has a function of purifying specific components contained in exhaust gas when the catalyst is in an activated state. Therefore, in order to use this function immediately after the start of the engine (especially immediately after cold start), it is important to warm up the catalyst rapidly by some means. Specifically, it is important to raise a bed temperature of the catalyst to an activation temperature range in a short time.

In this respect, if the heat shield films having swing characteristic are formed on each surfaces of component parts of an exhaust system including the wall surface of the combustion chamber, the surface of the parachute part and the inner wall of the exhaust manifold, it is possible to rapidly increase the temperature of the exhaust gas which flows into the catalyst. However, unlike the combustion chamber into which intake air flows in each cycle, the exhaust manifold or the exhaust pipe is able to exchange heat only with an outside. Therefore, if the heat shield film is formed on all of the inner walls of the exhaust manifold and exhaust pipe, it is expected that the temperature of the exhaust gas continues to be high even after the warming-up of the catalyst is completed. Therefore, there is a possibility that deterioration of the catalyst tends to progress easily.

The present disclosure addresses the above described problem, and an object of the present disclosure is, to provide an internal combustion engine which realizes early activation of a catalyst by using a heat shield film having the swing characteristic while suppressing deterioration of the catalyst.

SUMMARY

A first aspect of the present disclosure is an internal combustion engine for solving the problem described above and has the following features.

The internal combustion engine comprises a plurality of combustion chambers, a plurality of exhaust ports, a plurality of exhaust valves, a plurality of branch pipes, an exhaust pipe and a catalyst.

Each of the combustion chambers is formed by a bore surface of a cylinder block, a bottom surface of a cylinder head and a top surface of a piston.

Any one of the exhaust ports is connected to any one of the combustion chambers.

Any one of the exhaust valves is configured to open and close any one of the exhaust ports.

Any one of the branch pipes is connected to any one of the exhaust ports.

The exhaust pipe is connected to a junction part at which the branch pipes join together.

The catalyst is provided in a middle of the exhaust pipe.

A heat shield film is formed on at least one part of a wall surface which constitutes the combustion chamber.

The heat shield film has lower thermophysical properties in terms of thermal conductivity and thermal capacity per unit volume than a base material of the wall surface.

The heat shield film is further formed on a surface of a component part of an exhaust system from the catalyst to a specified combustion chamber.

The heat shield film is not formed on the surface of the component part of the exhaust system from the junction part to the other combustion chamber than the specified combustion chamber.

A second aspect of the present disclosure has the following features according to the first aspect.

The heat shield film includes a first heat shield film and a second heat shield film.

The first heat shield film is formed on the wall surface constituting the combustion chamber.

The second heat shield film is formed on the surface of the component part of the exhaust system.

The thermal capacity per unit volume of the second heat shield film is lower than that of the first heat shield film.

A third aspect of the present disclosure has the following features according to the second aspect.

The first and second heat shield films are composed of a common film material.

The second heat shield film is thinner than the first heat shield film.

A fourth aspect of the present disclosure has the following features according to the first aspect.

The internal combustion engine further comprises a plurality of injectors and a controller.

Any one of the injectors is provided in any one of the combustion chambers.

The controller is configured to control fuel injection from the injectors.

The controller is further configured to execute a cylinder halt control under a predetermined operation condition after warming-up of the catalyst.

In the cylinder halt control, the controller continues the fuel injection from the injector of the specified combustion chamber while halting the fuel injection from the injector of the other combustion chamber than the specified combustion chamber.

According to the first aspect, since the heat shield film is formed not only on the wall surface constituting the combustion chamber but also on the surface of the component part of the exhaust system, a heat shielding action is expected on these surfaces. Therefore, it is possible to realize early activation of the catalyst. Further, according to the first aspect, since the heat shield film is not formed on the surface of the component part of the exhaust system from the junction part to the other combustion chamber than the specified combustion chamber, a heat release action is expected on the surface. Therefore, it is possible to suppress a state where temperature of the exhaust gas flowing into the catalyst is high continues after the warming-up of the catalyst. Therefore, it is possible to suppress the degradation of the catalyst.

According to the second aspect, the thermal capacity per unit volume of the second heat shield film is lower than that of the first heat shield film. Therefore, it is possible to suppress in an effective manner the state where temperature of the exhaust gas flowing into the catalyst is high continues after the warming-up of the catalyst.

According to the third aspect, the second heat shield film is thinner than the first heat shield film. Therefore, when the first and second heat shield are composed of the common film material, it is possible to suppress in an effective manner the state where temperature of the exhaust gas flowing into the catalyst is high continues after the warming-up of the catalyst.

According to the fourth aspect, the cylinder halt control is executed. During the cylinder halt control, exhaust energy of the exhaust gas from the combustion chamber of the specified cylinder is efficiently provided to the catalyst. Therefore, it is possible to maintain the catalyst in an activation state during the cylinder halt control.

DESCRIPTION OF EMBODIMENTS

Figure 1:
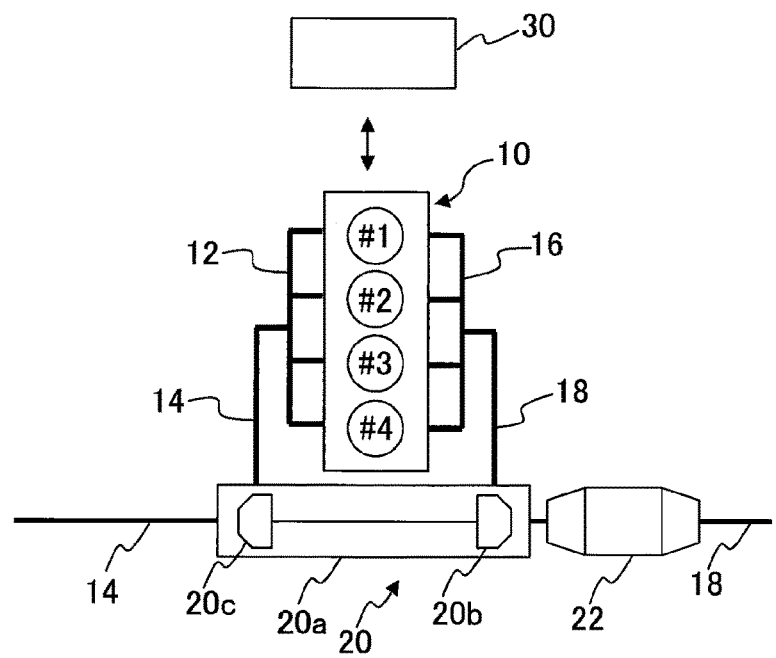
FIG. 1 is a diagram for illustrating a configuration of an internal combustion engine according to a first embodiment of the present disclosure.

Hereinafter, embodiments of the present disclosure will be described based on the accompanying drawings. Note that elements that are common to the respective drawings are denoted by the same reference characters and a duplicate description thereof is omitted.

First Embodiment

A first embodiment of the present disclosure will be described with reference to FIGS. 1 to 6.

1. Description of a Configuration of an Internal Combustion Engine

FIG. 1 is a diagram for describing a configuration of an internal combustion engine according to the first embodiment. The internal combustion engine shown in FIG. 1 includes an engine main body 10. The engine main body 10 is an in-line four-cylinder compression self-ignition engine mounted on a vehicle as a driving source. An ignition order of this engine is, for example, an order of a first cylinder #1, a third cylinder #3, a fourth cylinder #4, and a second cylinder #2. The number of cylinders and the cylinder arrangement of the engine main body 10 applied to the internal combustion engine according to the first embodiment are not limited to this. Also, the engine main body 10 may be a spark ignition engine.

Each of the cylinders of the engine main body 10 is connected to an intake manifold 12. More specifically, the intake manifold 12 is connected to each intake ports of the engine main body 10. Like the intake manifold 12, each of the cylinders is connected to an exhaust manifold 16. The four branch pipes constituting the exhaust manifold 16 join at their downstream side and are connected to an exhaust pipe 18.

In a middle of the exhaust pipe 18, a turbocharger 20 is provided. The turbocharger 20 includes a housing 20a. The housing 20a houses a turbine 20b and a compressor 20e connected to the turbine 20b. When the turbine 20 b rotates in response to exhaust pressure, the compressor 20c is driven. As a result, air (i.e., intake air) flowing into the housing 20a is compressed and supercharged.

In the exhaust pipe 18, a catalyst 22 is provided downstream of the supercharger 20. The catalyst 22 has function of oxidizing carbon monoxide (CO), hydrogen carbon (HC), and nitrogen monoxide (NO) contained in exhaust gas when the catalyst 22 is in the activated state. If the engine main body 10 is composed of the spark ignition engine, a three-way catalyst is used as the catalyst 22. The three-way catalyst has function of oxidizing or reducing carbon monoxide (CO), hydrogen carbon (HC), and nitrogen oxides (NOx) contained in the exhaust gas when the three-way catalyst is in the activated state.

The internal combustion engine shown in FIG. 1 includes an electronic control unit (ECU) 30. The ECU 30 includes a central processing unit (CPU), a read only memory (ROM), a random access memory (RAM), and the like. The ECU 30 loads programs stored in the ROM into the RAM and executes the programs by the CPU, thereby realizing various functions. The ECU 30 may be composed of a plurality of electronic control units. For example, the ECU 30 obtains and process signals from various sensors mounted on the vehicle, and operates various actuators in accordance with a predetermined control program. The actuator operated by the ECU 30 includes at least an injector and a glow plug. The injector and the glow plug are provided in each cylinder of the engine main body 10.

2. Description of a Heat Shield Film 2.1 Formation Site of a Heat Shield Film

Figure 2:
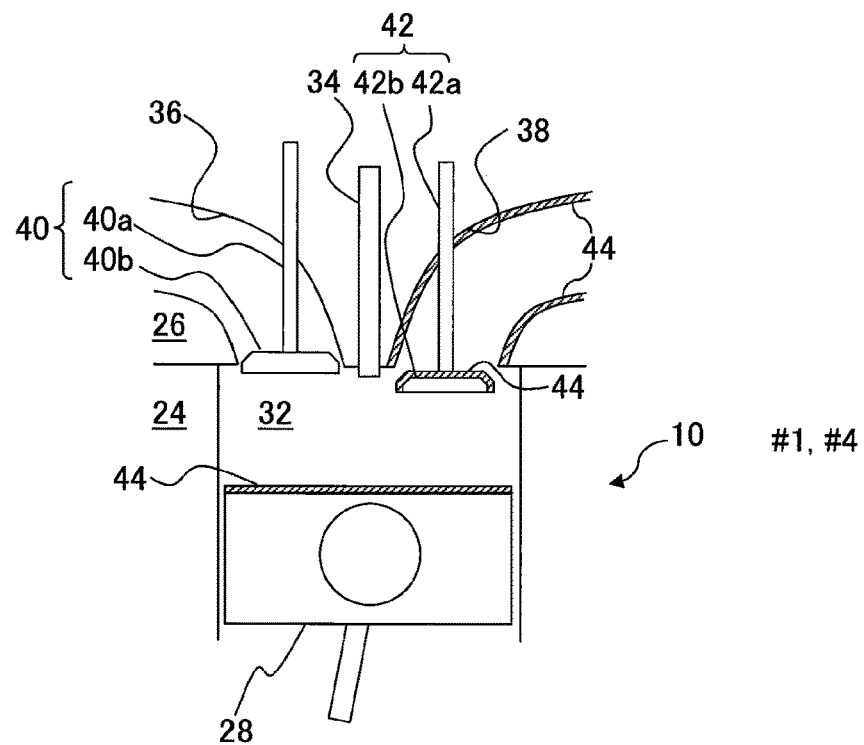
FIG. 2 is a cross-sectional view of an engine main body (a first cylinder #1 or a fourth cylinder #4)
Figure 3:
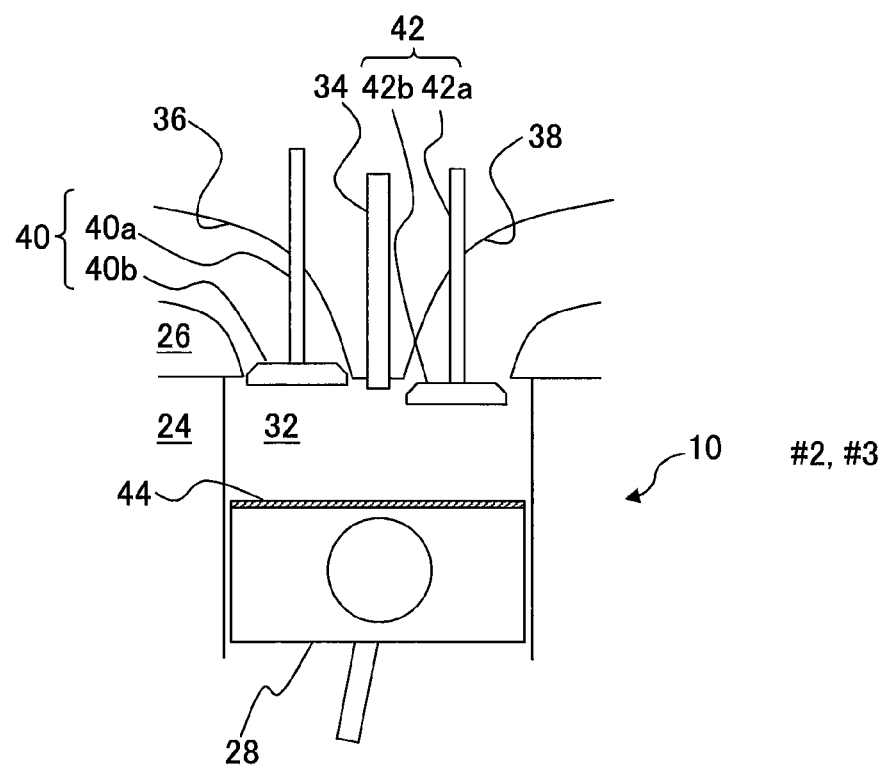
FIG. 3 is a cross-sectional view of an engine main body (a second cylinder #2 or a third cylinder #3)

FIGS. 2 and 3 are schematic sectional views of the engine main body 10 shown in FIG. 1. FIG. 2 corresponds to a cross-sectional view of the first cylinder #1 or the fourth cylinder #4. FIG. 3 corresponds to a schematic cross-sectional view of the second cylinder #2 or the third cylinder #3. As shown in FIGS. 2 and 3, the engine main body 10 includes a cylinder block 24, a cylinder head 26, and a piston 28. The space partitioned by the bore surface of the cylinder block 24, the bottom surface of the cylinder head 26, and the top surface of the piston 28 is defined as a combustion chamber 32. In the combustion chamber 32, an injector 34 is arranged. The injector 34 is configured to inject fuel into the combustion chamber 32 based on an injection instruction from the ECU 30.

The combustion chamber 32 communicates with an intake port 36 and an exhaust port 38. The intake port 36 and the exhaust port 38 are spaces formed inside the cylinder head 26. In the intake port 36, an intake valve 40 is provided. The intake valve 40 includes a shaft part 40a and a parachute part 40b. In the exhaust port 38, an exhaust valve 42 is provided. The exhaust valve 42 includes a shaft part 42a and a parachute part 42b.

As can be understood by comparing FIGS. 2 and 3, the basic configuration of the combustion chamber 32 is common among the first cylinder #1 to the fourth cylinder #4. However, the first cylinder #1 and the fourth cylinder #4 (hereinafter also referred to as "specified cylinders") are different from the second cylinder #2 and the third cylinder #3 (hereinafter also referred to as "other cylinders") in forming sites of a heat shield film 44. More specifically, in the specified cylinders, the heat shield film 44 is formed on the top surface of the piston 28, the surface of the parachute part 42b of the exhaust valve 42, and the wall surface of the exhaust port 38. On the other hand, in the other cylinders, the heat shield film 44 is formed only on the top surface of piston 28.

Figure 4:
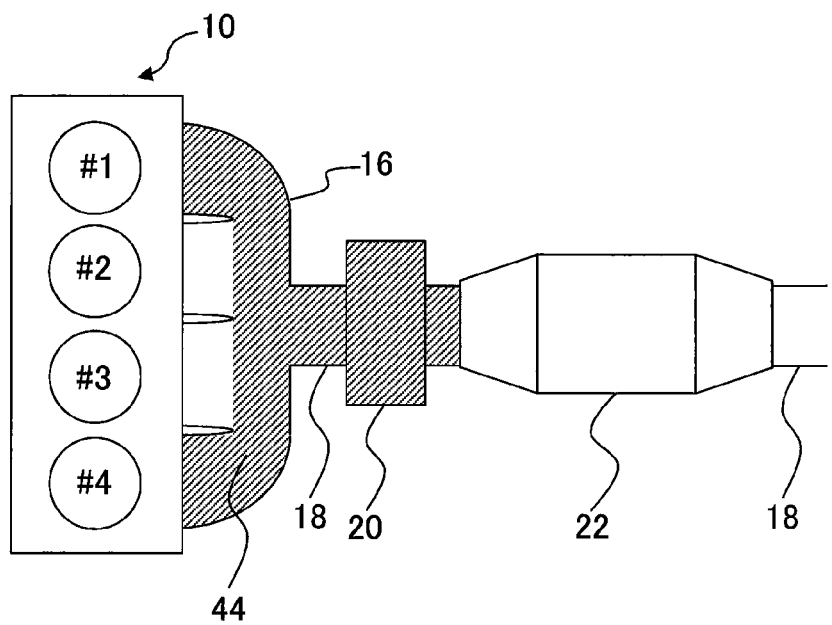
FIG. 4 is a diagram for describing a formation site of a heat shield film on a downstream side of exhaust ports.

The heat shield film 44 is also formed on the downstream side of the exhaust port 38. FIG. 4 is a diagram for describing the formation site of the heat shield film 44 on the downstream side of the exhaust port 38 shown in FIG. 2. As shown in FIG. 4, the heat shield film 44 is formed on the inner wall of the exhaust manifold 16, the inner wall of the exhaust pipe 18, and the inner wall of the housing 20a. Although not shown, a heat shield film 44 is also formed on surfaces of blades of the turbine 20b. However, the heat shield film 44 is not formed on the inner wall of the branch pipe connected to the exhaust port of the other cylinders. The heat shield film 44 is not formed on the inner wall of the exhaust pipe 18 on the downstream side of the catalyst 22. The reason why the heat shield film 44 is not formed will be described later.

2.2 Construction of the Heat Shield Film

The heat shield film 44 described with reference to FIGS. 2 to 4 is composed of the same type of film material. The heat shield film 44 is composed of, for example, an alumite film. The alumite is a porous alumina obtained by anodization of a formation site where the heat shield film 44 is expected to be formed. The porous alumina has a lower thermal conductivity than that of the base material such as the combustion chamber 32 and the parachute part 40b (more specifically, aluminum alloy). Furthermore, the porous alumina has a lower thermal capacity per unit volume than that of the base material. Accordingly, the heat shield film 44 has the swing characteristic described above.

The heat shield film 44 may be composed of a coating film including hollow particles such as hollow silica particulates. This coating film is a porous film obtained by applying to the formation site of the heat shield film 44 a silicon typed solution (e.g., polysiloxane, polysilazane) in which the hollow particles are dispersed and then subjecting the solution to heat treatment. The heat shield film 44 may be composed of a sprayed film. This sprayed film is a porous film obtained by thermal spraying treatment of ceramics powders such as zirconia, alumina, titania or composite ceramics powders such as cermet, mullite, cordierite, steatite and the like.

The film thickness of the heat shield film 44 is adjusted to 10 to 200 μm according to the target thermophysical properties (i.e., the thermal conductivity and the thermal capacity per unit volume). In the first embodiment, since the heat shield film 44 is composed of a common film material (i.e., a single film material is used for every the heat shield films 44), the target thermophysical properties are uniform irrespective of the site on which the heat shield film 44 is formed.

3. Characteristics of the First Embodiment 3.1 Engine Control of at an Engine Start In the first embodiment, an engine control for promoting the activation of the catalyst 22 (hereinafter also referred to as an "activation control") is executed by the ECU 30 shown in FIG. 1 as an engine control at an engine start. In the activation control, more specifically, an energization to the glow plugs which is executed at the engine start is continuously executed after warming-up of the engine main body 10 is completed. According to the activation control, the catalyst 22 is activated in a short time. The activation control is terminated after a predetermined time has elapsed from the engine start. When the engine main body 10 is composed of the spark ignition engine, the activation control is executed by a retardation of ignition timing and a fuel injection after compression top dead center.

3.2 Problems Caused by the Formation Site of the Heat Shield Film

If the heat shield film having the swing characteristics (hereinafter also referred to as a "swing film") is formed on the wall surface of the combustion chamber (i.e., the top surface of piston 28), a heat shielding action due to low thermal conductivity of the swing film is expected. Therefore, during the activation control, combustion gas with high temperature generated in the combustion chamber should be provided to the catalyst. However, in many cases temperature of component parts constituting an exhaust system between the combustion chamber and the catalyst (e.g., the exhaust valves, the exhaust ports, the exhaust manifolds and the exhaust pipe) has not risen sufficiently at the engine start. In such a case, thermal energy of the combustion gas discharged from the combustion chamber (i.e., the exhaust gas) is deprived by the component parts. Especially at cold start, much of the thermal energy is deprived by the component parts.

Figure 5:
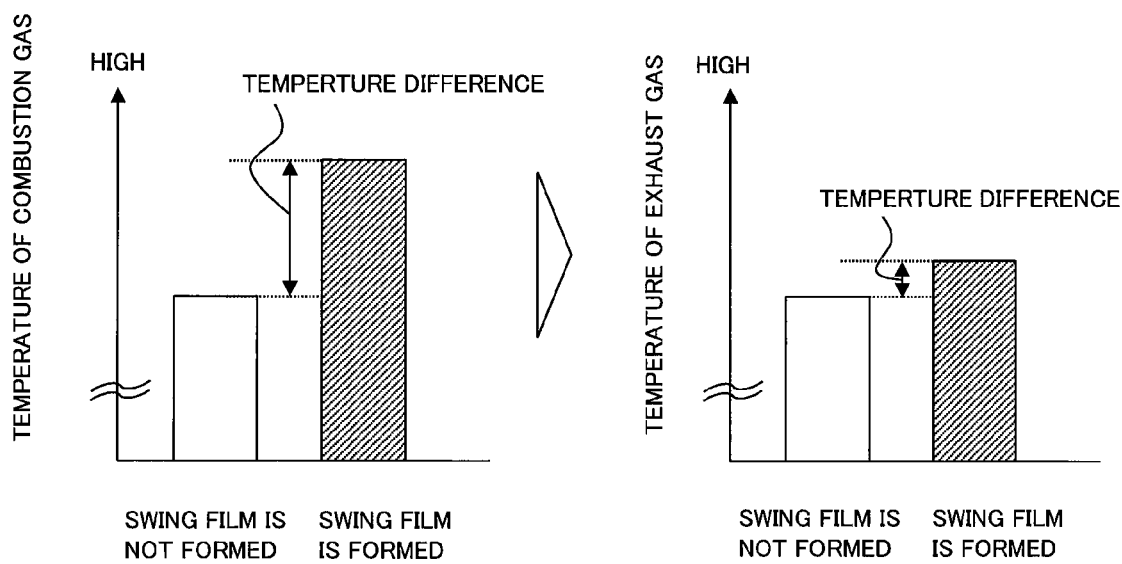
FIG. 5 is a diagram for showing a relationship between a swing film on a wall surface of a combustion chamber and temperature of gas at an engine start.

FIG. 5 is a diagram for showing a relationship between the swing film on the wall surface of the combustion chamber and temperature of gas at the engine start. As shown by leftward of FIG. 5, when the swing film is formed on the wall surface of the combustion chamber, the maximum temperature of the gas in the combustion chamber (i.e., the combustion gas) increases as compared with a case where the swing film is not formed. Therefore, a difference in the maximum temperature of the combustion gas between the two cases increases. However, in the rightward of FIG. 5, the difference in the maximum temperature of the exhaust gas decreases. This is because that when the swing film is formed only on the wall surface of the combustion chamber, the combustion gas discharged from the combustion chamber is cooled by the component parts.

If a heat shield film composed of a general ceramics material is formed on the entire surface of the component parts, the temperature of the exhaust gas flowing into the catalyst is increased owe to the heat shielding action of this heat shield film. However, the heat shield film composing of the ceramics material has higher thermal conductivity than the swing film. Therefore, the thermal energy of the exhaust gas is liable to be deprived by the component parts. Then, it is difficult to increase the temperature of the exhaust gas flowing into the catalyst in a short time. In this regard, if the swing film is formed on the entire surface of the component parts, the heat shielding action owe to the swing film is expected. Therefore, the difference in the maximum temperature of the exhaust gas at the engine start can be brought close to that of the combustion gas. Then, it is possible to increase the temperature of the exhaust gas flowing into the catalyst in a short time.

Figure 6:
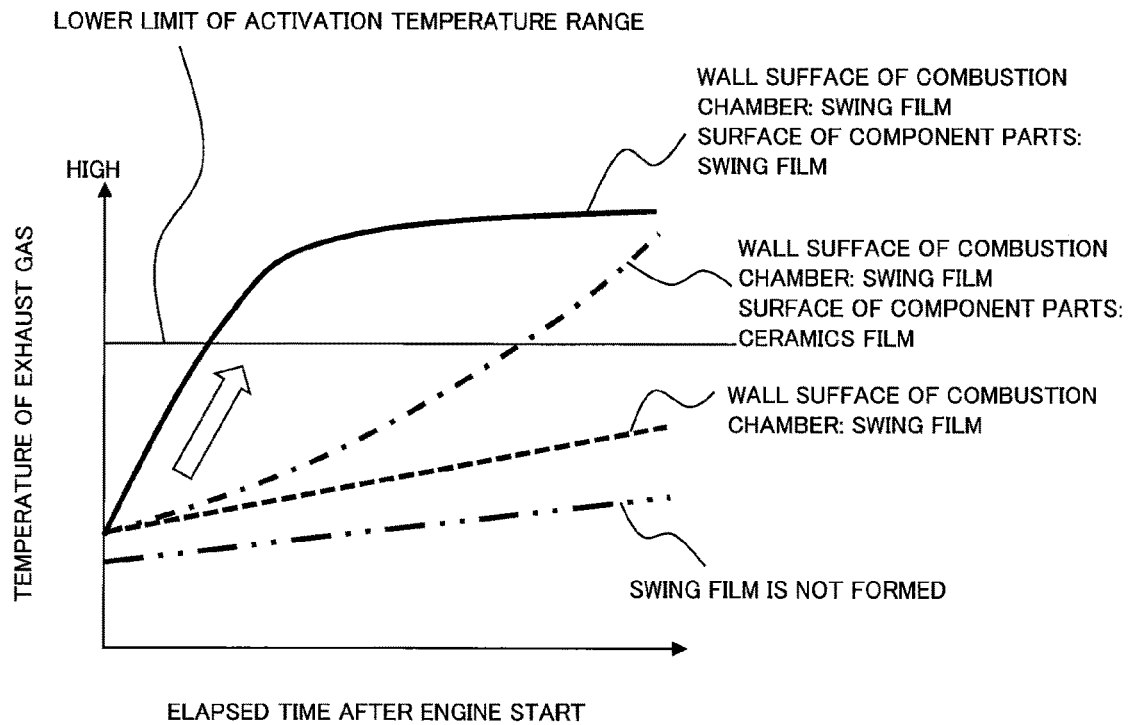
FIG. 6 is a diagram for describing a relationship between an elapsed time after the engine start and temperature of exhaust gas flowing into a catalyst.

FIG. 6 is a diagram for describing a relationship between an elapsed time after the engine start and temperature of the exhaust gas flowing into the catalyst. As shown in FIG. 6, in cases where the swing film is not formed (shown with a two-dot chain line) and the swing film is formed only on the wall surface of the combustion chamber (shown with a broken line), temperature of the exhaust gas is hard to increase. In addition, when the swing film is formed on the wall surface of the combustion chamber and the ceramic heat shield film is formed on the entire surface of the component parts (shown with a dot-dash line), it takes time to increase the temperature of the exhaust gas. In this regard, when the swing film is formed on both the wall surface of the combustion chamber and the entire surface of the component parts (shown with a solid line), it is possible to increase the temperature of the exhaust gas in a short time.

However, if the swing film is formed on the entire surface of the component parts, the temperature of the exhaust gas flowing into the catalyst continues to be high even after the activation (i.e., warming-up) of the catalyst is completed. That is, the temperature of the exhaust gas in the warm steady state is kept high. In such a case, from a viewpoint of protecting the catalyst, an engine control for decreasing the temperature of the exhaust gas will be required frequently.

3.3 Action and Effects According to the Formation Site of the Heat Shield Film

In this regard, according to the first embodiment, the heat shield film 44 is formed on the surface of the component parts from the combustion chamber 32 to the catalyst 22. Therefore, in a vicinity of the component parts with the heat shield film 44 (i.e., the parachute parts 42b of the specified cylinders, the exhaust ports 38 of the specified cylinders, the branch pipes connected to the exhaust ports 38 of the specified cylinders, the exhaust pipe 18 and the housing 20a), the temperature of the exhaust gas is kept high owe to the heat shielding action of the heat shield film 44. Therefore, it is possible to complete the activation control in a short time. In other word, it is possible to shorten the execution period for the activation control. Therefore, it is possible to shorten energization time of the glow plug and suppress power consumption for the activation control. If the engine main body 10 is composed of the spark ignition engine, it is possible to reduce fuel consumption for the activation control.

In addition, according to the first embodiment, the heat shield film 44 is not formed on a part of the surface of the component parts from the catalyst 22 to the combustion chamber 32. Therefore, in the vicinity of the component parts without the heat shield film 44 (i.e., the parachute parts 42b of the other cylinders, the exhaust ports 38 of the other cylinders, and the branch pipes connected to the exhaust port 38 of the other cylinders), the exhaust gas is cooled. Therefore, it is possible to suppress a state where temperature of the exhaust gas flowing into the catalyst 22 is high continues after the activation of the catalyst is completed. Therefore, it is possible to suppress progress in degradation of the catalyst 22. It is also possible to reduce the number of executions of the engine control for protecting the catalyst 22.

Second Embodiment

Next, a second embodiment of the present disclosure will be described with reference to FIG. 7. Since the configuration of the internal combustion engine, the portion of the heat shield film, and the contents of the activation control of the second embodiment are the same as those of the first embodiment, the description of these will be omitted.

1. Characteristics of the Second Embodiment 1.1 Structure of the Heat Shield Film In the first embodiment, the target thermophysical properties of the swing film were made uniform regardless of the formation site. In the second embodiment, the swing film formed on the wall surface of the combustion chamber (hereinafter also referred to as a "swing film MC") and the swing film formed on the surface of the component part of the exhaust system (hereinafter also referred to as a "swing film ME") are different from each other in term of thermal capacity C. More specifically, the thermal capacity CE of the swing film ME is made smaller than the thermal capacity CC of the swing film MC.

The thermal capacity C [kJ/K] is expressed by the following formula (1) using density ρ [kg/m3], specific heat Cp [kJ/(kg·K)] and volume V [m3].

$$C=(\rho \times Cp) \times V \qquad (1)$$

In the second embodiment, the thermal capacity CE is made smaller than the thermal capacity CC by changing at least one of density ρ, specific heat Cp, volume V. More specifically, the thermal capacity CE is made smaller than the thermal capacity CC by the following methods (1) and (2).

(1) When the swing films ME and MC are made from the same kind of film material
 (1a) Increase the swing film ME higher than that of the swing film MC
 (1b) Reduce film thickness of the swing film ME smaller than that of the swing film MC
 (1c) Combine the methods 1a and 1b
(2) When the swing films ME and MC are made from different film materials
 (2a) Reduce specific heat of the swing film ME smaller than that of the swing film MC (2b) Combine the methods 1a and 2a
(2c) Combine the methods 1b and 2a
(2d) Combine the methods 1a, 1b and 2a

1.2 Action and Effects According to the Swing Films ME and MC

Figure 7:
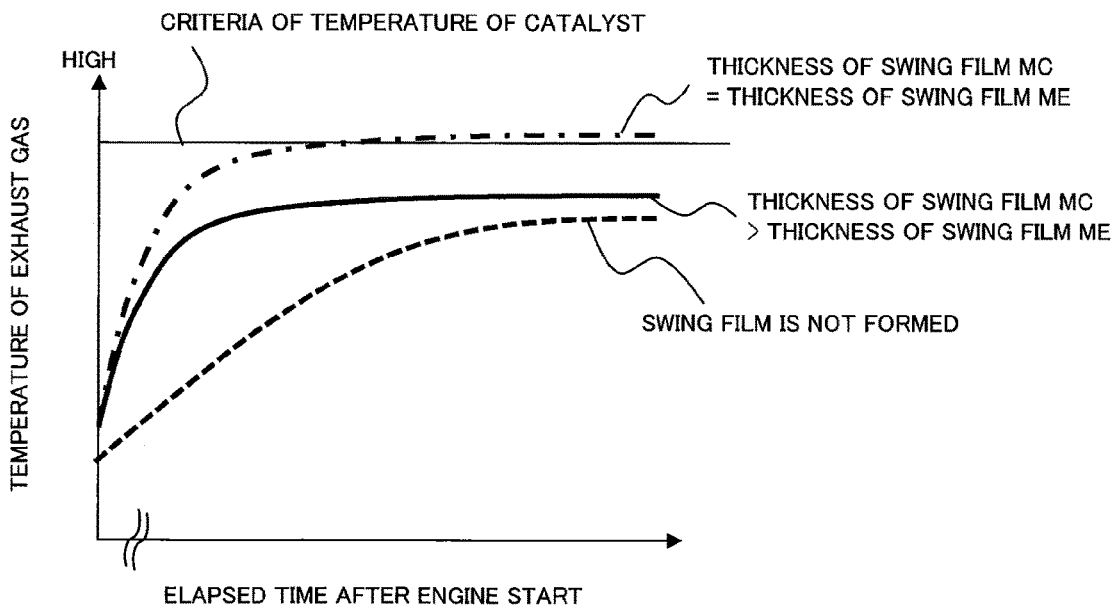
FIG. 7 is a diagram for describing the relationship between the elapsed time after the engine start and temperature of the exhaust gas flowing into the catalyst.

FIG. 7 is a diagram for describing the relationship between the elapsed time after the engine start and temperature of the exhaust gas flowing into the catalyst. Unlike FIG. 6 focusing on temperature of the exhaust gas immediately after the engine start, FIG. 7 focuses on the temperature after the activation of the catalyst is completed. As shown in FIG. 7, when the swing films MC and ME are made equal in term of the film thickness (shown with a dot-dash line), the temperature of the exhaust gas continues to be high. Therefore, in this case, it can easily exceed a criteria of temperature of the catalyst. In contrast, when the swing film ME is made thinner than the swing film MC (shown with a solid line), total volume of the swing film ME becomes smaller than that of the swing film MC. Therefore, it is possible to keep the temperature of the exhaust gas below the criteria. Therefore, it is possible to avoid the execution of the engine control for protecting the catalyst 22 described above.

Third Embodiment

Next, a third embodiment of the present disclosure will be described. Since the configuration of the internal combustion engine, the portion of the heat shield film, and the contents of the activation control of the third embodiment are the same as those of the first embodiment, the description of these will be omitted.

1. Characteristics of the Third Embodiment

1.1 Engine Control During Warm Steady State

In the third embodiment, an engine control in which the fuel injection at the specified cylinder is continued while pausing at the other cylinders (hereinafter referred to as a "cylinder halt control") is executed by the ECU 30 shown in FIG. 1 during warm steady state. The cylinder halt control is executed, for example, when an operating condition of the engine is in a low-load region or when a predetermined condition for an idling operation is established. The predetermined condition for the idling operation is, for example, an operating condition established when vehicle speed is equal to or less than a predetermined speed and when an accelerator position of an accelerator pedal is less than a predetermined amount.

1.2 Action and Effects According to the Execution of the Cylinder Halt Control As already described that the heat shield film 44 is not formed on the parachute parts 42b of the other cylinders, the exhaust ports 38 of the other cylinders, and the branch pipes connected to the exhaust ports 38 of the other cylinders. Therefore, when the cylinder halt control is executed, the combustion gas is not discharged from the combustion chambers of the other cylinders but is discharged from the combustion chamber of the specified cylinder to flow into the catalyst 22. Therefore, when the operating condition is in the low-load region or when the predetermined condition for idling operation is established, the thermal energy of the combustion gas discharged from the combustion chamber of the specified cylinder is efficiently input to the catalyst, thereby the activation state of the catalyst is maintained.

Other Embodiments

The internal combustion engine according to each of the embodiments described above may be modified as follows.

In the first embodiment, the first cylinder #1 and the fourth cylinder #4 are defined as the specified cylinders while the second cylinder #2 and the third cylinder #3 are defined as the other cylinders. However, the combination of the specified cylinders and other cylinders is not limited to this. For example, only the first cylinder #1 may be defined as the specified cylinder while the second cylinder #2 to the fourth cylinder #4 may be defined as the other cylinders. It is also possible to define the first cylinder #1 and the third cylinder #3 as the specified cylinders while defining the second cylinder #2 and the fourth cylinder #4 as the other cylinders. Various modifications of the internal combustion engine according to the first embodiment are possible as long as at least one cylinder is defined to the specified cylinder while the remaining cylinders are defined as the other cylinders.

In the embodiments described above, when referring to the number, the quantity, the range of each element, unless otherwise stated or unless the number is clearly specified in principle, the present disclosure is not limited thereto. In addition, the structure described in the embodiments is not necessarily indispensable to the present disclosure unless otherwise specified or clearly specified in principle.

What is claimed is:

1. An internal combustion engine comprising:
a plurality of combustion chambers, each formed by a bore surface of a cylinder block, a bottom surface of a cylinder head and a top surface of a piston;
a plurality of exhaust ports, each connected to a respective one of the combustion chambers;
a plurality of exhaust valves, each configured to open and close a respective one of the exhaust ports;
a plurality of branch pipes, each connected to a respective one of the exhaust ports;
an exhaust pipe which is connected to a junction part at which the branch pipes join together; and
a catalyst which is provided in a middle of the exhaust pipe, wherein:
a heat shield film is on at least one part of a wall surface of each of the combustion chambers, the heat shield film has lower thermophysical properties in terms of thermal conductivity and thermal capacity per unit volume than a base material of the wall surface;
the heat shield film is further on a surface of at least one of the respective one of the exhaust ports and the respective one of the exhaust valves connected to a specified combustion chamber of the plurality of combustion chambers; and
the heat shield film is not on a surface of at least one of the respective one of the exhaust ports and the respective one of the exhaust valves connected to an other combustion chamber of the plurality of combustion chambers than the specified combustion chamber.

2. The internal combustion engine according to claim 1, wherein the heat shield film includes a first heat shield film and a second heat shield film, the first heat shield film is on the wall surface of each of the combustion chambers, the second heat shield film is on the surface of the at least one of the respective one of the exhaust ports and the respective one of the exhaust valves connected to the specified combustion chamber, wherein a thermal capacity of the second heat shield film is lower than a thermal capacity of the first heat shield film.

3. The internal combustion engine according claim 2, wherein the second heat shield film is thinner than the first heat shield film.

4. The internal combustion engine according to claim 1, further comprising:

a plurality of injectors, each injector provided in a respective one of the plurality of combustion chambers; and a controller which is configured to control fuel injection from the injectors, wherein the controller is further configured to execute a cylinder halt control under a predetermined operation condition after warming-up of the catalyst, wherein, in the cylinder halt control, the controller continues the fuel injection from an injector of the plurality of injectors provided to the specified combustion chamber while halting the fuel injection from an injector of the plurality of injectors provided to the other combustion chamber.

* * * * *